H. SPEER.
Revolving Stalk-Rake.

No. 225,952. Patented Mar. 30, 1880.

Witnesses:
Fred G. Diettrich
J. R. Littell

Inventor
Hiram Speer
by C. A. Snow & Co. Att'ys

UNITED STATES PATENT OFFICE.

HIRAM SPEER, OF BLUE SPRINGS, NEBRASKA.

REVOLVING STALK-RAKE.

SPECIFICATION forming part of Letters Patent No. 225,952, dated March 30, 1880.

Application filed September 4, 1879.

*To all whom it may concern:*

Be it known that I, HIRAM SPEER, of Blue Springs, in the county of Gage and State of Nebraska, have invented certain new and useful Improvements in Revolving Stalk-Rakes; and I do hereby declare that the following is a full, clear, and exact description of the invention, which will enable others skilled in the art to which it appertains to make and use the same, reference being had to the accompanying drawings, which form a part of this specification.

Figure 1:
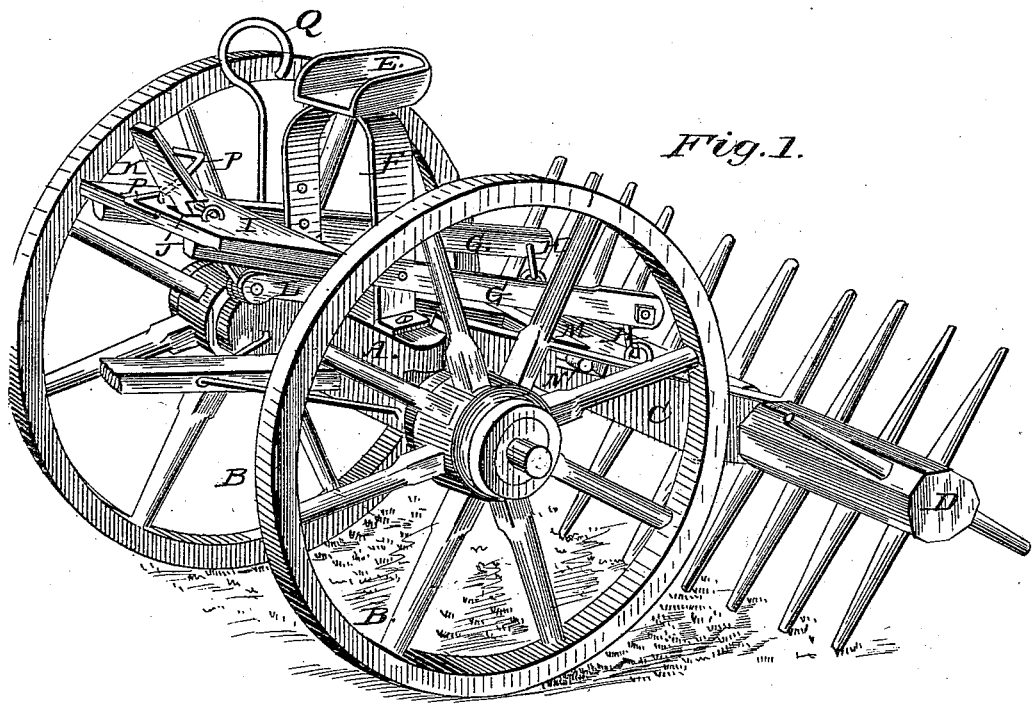
Figure 2:
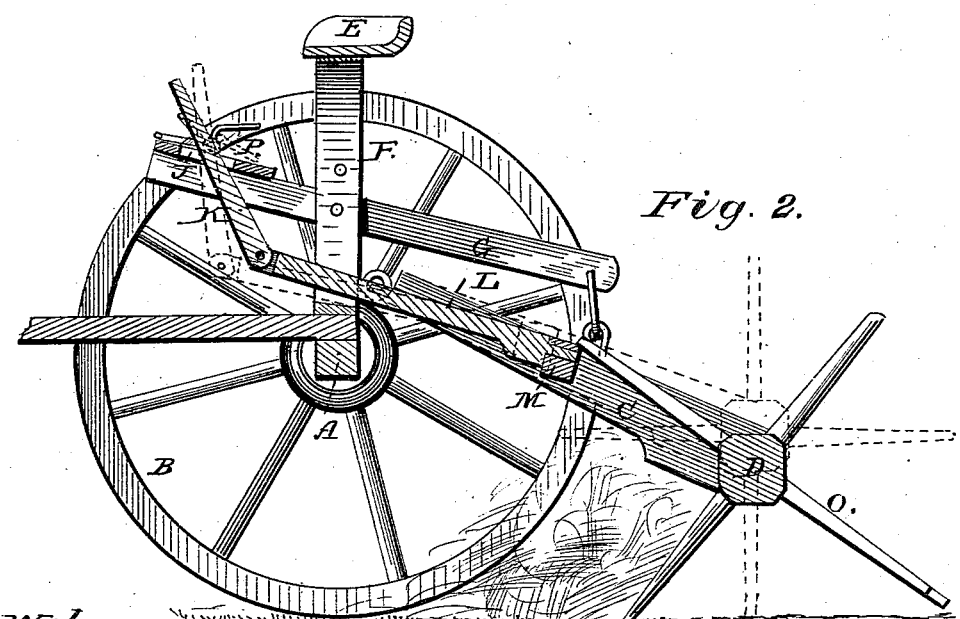

Figure 1 is a perspective view, and Fig. 2 is a longitudinal sectional view.

Similar letters of reference indicate corresponding parts in both figures.

This invention relates to revolving stalk-rakes; and it consists in certain improvements in the construction of the same, which will be hereinafter fully described, and particularly pointed out in the claim.

In the drawings, A represents the axle, which is supported upon the wheels B B. To the rear side of the axle are hinged rearwardly-extending bars C C, provided at their rear ends with journals or bearings for the revolving rake-head D. The driver's seat E is supported upon an arc, F, secured on top of the axle. To the sides of said arc are pivoted levers G G, the rear ends of which are connected to the bars C C by links H or other suitable means. Their front ends are connected by a platform, I, serving as a foot-board for the driver.

In a slot, J, in the foot-board I is pivoted a lever, K, the lower end of which is connected, by a rod, L, with a cross-piece, M, sliding in slots N N in the bars C C. The cross-piece M forms a support for the cross-piece O in the rake-head, the teeth of which are thereby retained in proper position for operation.

The lever K is operated by the foot of the driver, pressure of which causes it to throw the cross-piece M back under the cross-piece O by means of a double-crank shaft, P, pivoted upon the foot-board I and operated by the foot of the driver. The lever K may be operated in a reverse direction, thereby releasing the cross-piece O and permitting the rake to revolve.

From the foregoing description, and by reference to the drawings hereto annexed, the operation of my invention will be readily understood by those skilled in the art to which it appertains.

In turning the rake in the field the driver may throw his weight upon the foot-board, thereby balancing the rake and lifting it from the ground. To assist him in this I provide the axle with an upright or handle, Q.

Having thus described my invention, I claim and desire to secure by Letters Patent of the United States—

The combination of the axle A, hinged bars C C, having slots N, and revolving rake D, provided with cross-pieces O, levers G G, pivoted over the axle, and having their rear ends connected to the bars C C and their front ends connected by a foot-board, I, having slot J, lever K, connecting-rod L, cross-piece M, and double-crank shaft P, all arranged and operating substantially as and for the purpose herein set forth.

In testimony that I claim the foregoing as my own I have hereto affixed my signature in presence of two witnesses.

HIRAM SPEER.

Witnesses:
A. V. S. SAUNDERS,
R. PICKERING.